United States Patent Office 2,908,630
Patented Oct. 13, 1959

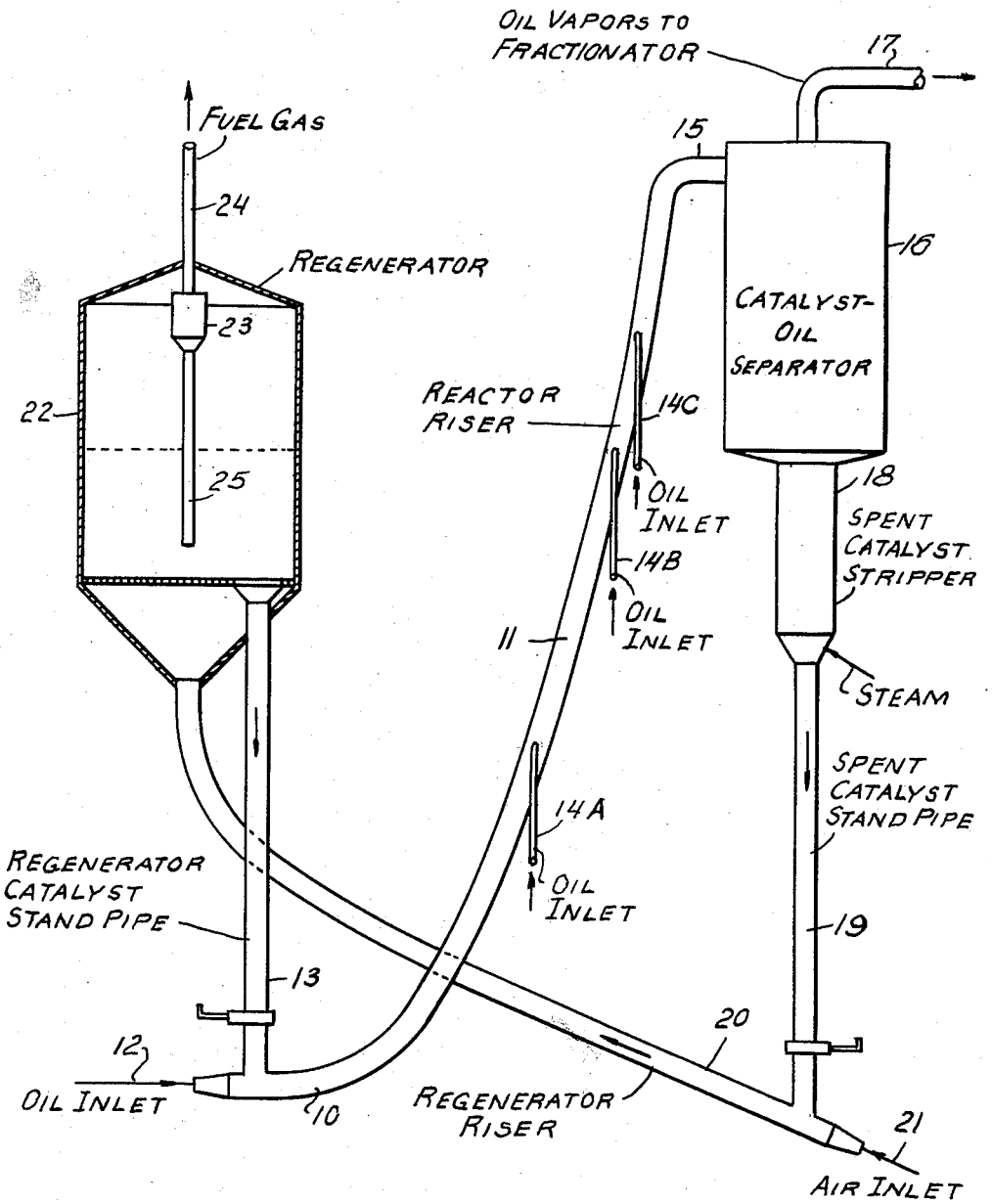

2,908,630

PROCESS FOR CRACKING A PLURALITY OF HYDROCARBON OILS IN A SUSPENSION OF CATALYST PARTICLES IN A RISER REACTOR

Bernard S. Friedman, Chicago, Ill., assignor to Sinclair Refining Company, New York, N.Y., a corporation of Maine Application September 1, 1953, Serial No. 377,757

2 Claims. (Cl. 208—74)

My invention relates to improvements in processing procedure in the conversion of petroleum hydrocarbons at elevated temperature in the presence of a finely divided solid catalyst.

Conventional methods for contacting hydrocarbon charge stocks with finely divided solid catalyst in conversion processes have subordinated consideration of optimum contact procedure from the standpoint of chemical kinetics to procedure providing optimum practicality in terms of process continuity, flexibility and simplicity. Thus the fluidized bed reaction system for catalytic cracking has been adopted commercially on a large scale because the charge stock can be readily contacted with catalyst and as the catalyst is maintained in the form of a dense phase fluidized bed, i.e., of about 25–40 pounds per cubic foot, a large enough mass of catalyst can be provided in a reaction vessel of feasible size for high conversion of charge stock at a relatively high rate of throughput. Catalyst can be readily circulated from and recirculated to the bed for purposes of regeneration and conditions of reaction severity can be readily controlled by raising or lowering the height of the bed to accommodate variation in feed stock or desired extent of conversion. The mixed state of the fluidized bed, however, results in a homogeneous reaction phase which produces a distribution of products, i.e. yield of gasoline and production of undesired coke and gas, for any given conversion level that is below optimum. It is known that significant improvement in product distribution can be achieved by conducting the conversion reaction under conditions of progressive flow and reaction, that is in an environment in which all molecules of the reacting constituents are treated equally to increasing reaction time and catalyst contact. For example, when fluidized catalyst processing is modified to obtain progressive reaction by flowing powdered catalyst with oil vapor concurrently through an elongated reaction zone at a high enough velocity to prevent forward-backward mixing, great improvement in product distribution results.

In the conventional operation of systems employing fluidized bed reaction or progressive reaction in catalytic cracking, however, it is customary in order to obtain higher conversions to charge some cycle oil together with virgin gas oil as a mixed feed stock to the system. A disadvantage in charging such a mixed feed is that the refractory bicyclic aromatics usually contained in the cycle stock are preferentially adsorbed on the catalyst, reducing the ability of the catalyst to crack paraffins and naphthenes. The fused ring aromatics cannot undergo cleavage to gasoline but instead tend to form still larger molecules which further condense to form coke on the catalyst. Similar stocks which are high in Conradson carbon number, for example, deasphalted gas oil produced by the propane treatment of reduced crude also contain coke-forming constituents. In the latter case the labile molecules in the deasphalted gas oil tend to coke the catalyst and to prevent the desired cracking of paraffins and naphthenes present in the fresh gas oil. I have now found, however, that product distribution in a flow system providing progressive flow and reaction in which finely divided catalyst in oil suspension is passed through an elongated reaction flow path can be further improved by utilizing only vapors of petroleum hydrocarbon charge stocks containing relatively low proportions of coke-forming constituents such as virgin gas oil to maintain progressive flow of catalyst along the reaction path and by introducing the petroleum hydrocarbon charge stocks containing higher proportions of coke-forming constituents, such as cycle oil heated to a high cracking temperature, further along the reaction path. Thus my improved method of catalytic hydrocarbon conversion provides preferential cracking of the petroleum hydrocarbon charge stocks since the feed stocks containing relatively high proportions of coke-forming constituents are contacted with the catalyst only after the catalyst has had an opportunity to react with the virgin feed in the first portion of the reaction path. In addition it provides a method of maintaining required high reaction temperature throughout the length of the reaction path.

According to my invention, a plurality of petroleum hydrocarbon charge stocks is subjected to conversion conditions in the presence of a finely divided solid catalyst under flow conditions providing progressive reaction. The portion of the petroleum hydrocarbon charge stock to be converted containing relatively low proportions of coke-forming constituents is vaporized and mixed with finely divided catalyst to form a suspension having a density of about 5 to 10 pounds per cubic foot and the suspension is flowed at a linear velocity exceeding about 12 to 15 feet per second upwardly through an elongated vertically extending reaction path. The remaining portion of the petroleum hydrocarbon charge stock containing relatively high proportions of coke-forming constituents is charged to the reaction flow path at a single point or at several points further along the confined reaction flow path.

The method of separate feed injection of my invention permits other types of operation in a more effective manner. For examle, a virgin gas oil may be added to the freshly regenerated catalyst at or near a point where it enters the reaction path. A recycle oil may be introduced at or near the half-way point of the reaction path and a deasphalted gas oil at or near the last one-eighth of the reaction path. The temperature at the point of entry of the deasphalted gas oil may be such as to permit a clean-up of coke forming constituents by means of selective cracking. The de-coked deasphalted gas oil could then be separated from the reaction effluent as recycle stock and returned to the system for further conversion. In another modification, a gasoline may be treated or retreated in the system by contact with the freshly regenerated catalyst and a virgin gas oil may be initially cracked by introduction to the system at a point further along the reaction path.

My invention will be further described by reference to the flow diagram of the accompanying drawing.

Preheated oil vapors containing relatively low proportions of coke-forming constituents, for example, a virgin gas oil, are charged to the inlet section 10 of reactor tube 11 by means of connection 12. Freshly regenerated catalyst from catalyst standpipe 13 is suspended in the oil vapors in inlet section 10 and the resulting suspension is flowed according to the particular equipment at charge rates providing a density of about 5 to about 10 pounds per cubic foot and a flow velocity of at least about 12 to 15 feet per second upwardly through reactor tube 11. One or more petroleum hydrocarbons containing relatively higher proportions of coke-forming constituents, for example, light recycle oils, heavy recycle oils, and deasphalted gas oils are charged to reactor tube 11 by means of connections 14A, 14B, and 14C, respectively. The effluent from reactor tube 11 is discharged tangentially through pipebend 15 through oil-catalyst separator 16. Vapors leave separator 16 overhead advantageously through a system of internal cyclones by means of line 17 leading to a conventional fractionation system. Catalyst disengaged in separator 16 settles in the lower section and passes by gravity into catalyst stripper 18 where it may be contacted with steam to strip adsorbed hydrocarbons from the catalyst surface. From stripper 18 catalyst flows into standpipe 19 and from thence into regenerator riser 20. Catalyst entering regenerator riser 20 is picked up by regeneration air introduced by connection 21 and the resulting mixture flows into regenerator 22 where the bulk of the carbon is burned off to regenerate the catalyst for reuse. Flue gas from the regeneration leaves regenerator 22 through a system of internal cyclones 23 and line 24. Dip-leg 25 is provided for return of catalyst disengaged in the cyclones to the catalyst bed.

The reaction conditions are adjusted according to the charge stock and the conversion level desired. The reaction temperature is in the range of about 850° to 1000° F.; the catalyst-to-oil ratio is in the range of about 10:1 to 25:1; and the weight hourly space velocity is in the range of about 5 to 60.

My invention has its greatest advantage in application to catalytic cracking of heavy petroleum hydrocarbon stocks. Typical stocks are light and heavy gas oils obtained by primary distillation, vacuum distillation or coking from crude oils of various sources and reduced crudes. The boiling range of these stocks may vary over a wide range, e.g., 450° to 600° F. for light gas oils and 600° to 800° F. for heavy gas oils. The invention is applicable to other petroleum hydrocarbon conversions. For example, catalytic reforming operations may be conducted with a finely divided catalyst under conditions of progressive flow reaction. Typical reforming stocks are heavy naphthas, particularly straight run naphthas of 250 to 450° F. boiling range.

I claim:

1. In the cracking of a plurality of petroleum hydrocarbon charge stocks in the presence of a finely divided solid catalyst under flow conditions providing progressive reaction, the method which comprises vaporizing a virgin gas oil to be converted, said gas oil containing relatively low proportions of coke-forming constituents, mixing said vapors with the finely divided catalyst to form a suspension having a density of about 5 to 10 pounds per cubic foot, flowing the suspension initially at a linear velocity exceeding about 12 to 15 feet per second upwardly through an elongated, vertically extending confined reaction flow path to crack said virgin gas oil, and introducing into the reaction flow path a recycle stock containing relatively high proportions of coke-forming constituents at a flow point past the position of introduction of the virgin gas oil to crack said recycle stock.

2. In the cracking of a plurality of petroleum hydrocarbon charge stocks in the presence of a finely divided solid catalyst under flow conditions providing progressive reaction, the method which comprises vaporizing a virgin gas oil to be converted, said gas oil containing relatively low proportions of coke-forming constituents, mixing said vapors with the finely divided catalyst to form a suspension having a density of about 5 to 10 pounds per cubic foot, flowing the suspension initially at a linear velocity exceeding about 12 to 15 feet per second upwardly through an elongated, vertically extending confined reaction flow path to crack said virgin gas oil, introducing into the reaction flow path a recycle stock containing relatively high proportions of coke-forming constituents at a flow point past the position of introduction of the virgin gas oil to crack said recycle stock and introducing a deasphalted gas oil containing a relatively high proportion of coke-forming constituents at a flow point past the position of introduction of said recycle stock to crack said deasphalted gas oil.

References Cited in the file of this patent

UNITED STATES PATENTS

| | | |
|---|---|---|
| 2,396,109 | Martin | Mar. 5, 1946 |
| 2,460,404 | Ward | Feb. 1, 1949 |
| 2,461,958 | Bonnell | Feb. 15, 1949 |
| 2,584,391 | Leffer | Feb. 5, 1952 |
| 2,587,670 | Weinrich | Mar. 4, 1952 |
| 2,662,844 | Leffer | Dec. 15, 1953 |
| 2,731,508 | Jahnig | Jan. 17, 1956 |
| 2,799,095 | May | July 16, 1957 |